P. E. HENNINGER.
MACHINE ELEMENT.
APPLICATION FILED AUG. 5, 1919.
1,421,231.
Patented June 27, 1922.
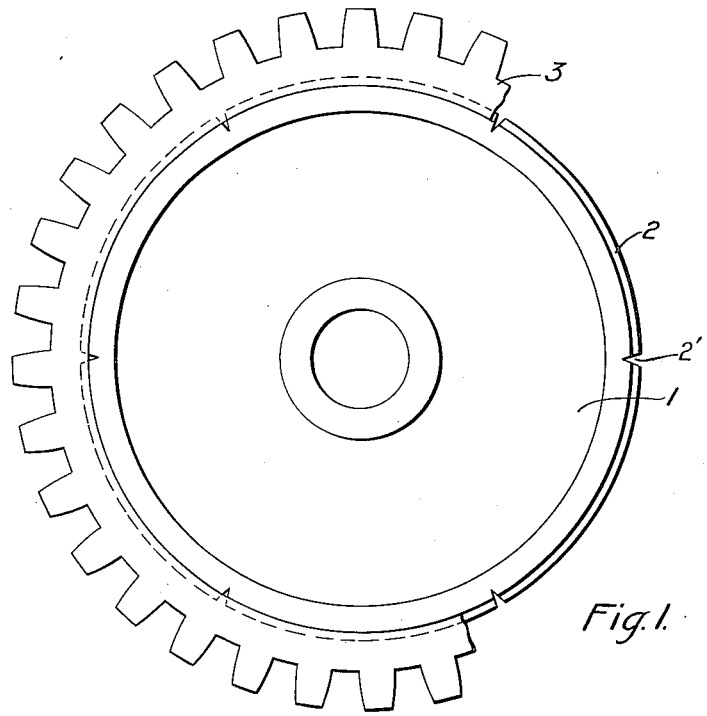
Fig. 1.
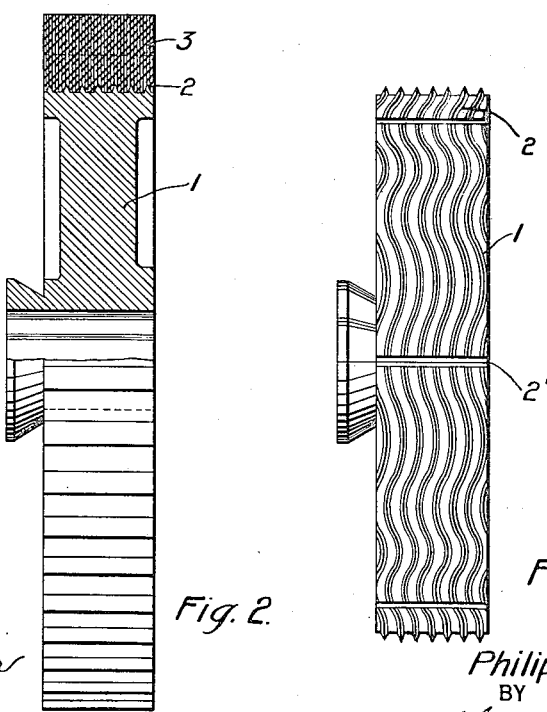
Fig. 2.
Fig. 3.
WITNESSES:
H. J. Shelhamer
O. E. Bee.
INVENTOR
Philip E. Henninger
BY
Wesley G. Carr
ATTORNEY

UNITED STATES PATENT OFFICE.

PHILIP E. HENNINGER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MACHINE ELEMENT.

1,421,231. Specification of Letters Patent. Patented June 27, 1922.

Application filed August 5, 1919. Serial No. 315,388.

*To all whom it may concern:*

Be it known that I, PHILIP E. HENNINGER, a citizen of the United States, and a resident of Edgewood Park, in the county of Allegheny and State of Pennsylvania, have invented a new and useful Improvement in Machine Elements, of which the following is a specification.

My invention relates to gear wheels and other machine elements or hubbed elements and it has, for one of its objects, to provide a machine element consisting of a support of metal or other suitable material to carry a working portion of non-metallic material and thereby obtain the combined advantages of the strong and inexpensive metal and of the silent and durable non-metallic material.

A more specific object of my invention is to provide a gear wheel consisting of a circular support or spider to which is secured a peripheral toothed ring composed of any suitable non-metallic material, such, for example, as the material known as micarta, which consists of fibrous material and a phenolic condensation product, or other binder, united into a hard and substantially homogeneous mass by means of heat and pressure.

Another object of my invention is to provide a simple and expeditious process of producing gear wheels or other machine elements of the above indicated character.

A still further object of my invention is to roughen the periphery of the hub portion of the machine element in such manner as to insure exceptionally good binding action between the impregnated fibrous material and the metallic hub portion.

In the accompanying drawings, Fig. 1 is a side elevation, parts being broken away, of a gear wheel constructed in accordance with my invention; Fig. 2 is an edge view, partially in section and partially in elevation, of the gear wheel shown in Fig. 1, and Fig. 3 is an edge view of a hub portion, illustrating the manner of roughening the periphery to insure good binding action between the hub portion and a non-metallic working portion molded thereon in accordance with my invention.

The gear wheel shown in Figs. 1 and 2 consists of a central support, hub or spider 1 composed of any suitable metal or metallic alloy. The periphery of the hub portion 1 is provided with waved ribs, as indicated at 2. The waved ribs may be provided by grooving the periphery of the hub 1 in any suitable manner, or they may be provided when the hub is formed or cast. The projecting ribs may be continuous rings symmetrically waved and of any desired pitch. In some instances it has been found advantageous to provide transverse grooves 2'. The projections and depressions provided on the periphery of the spider 1 serve to rigidly unite it to a toothed rim 3 which may consist of any suitable material.

I prefer to mold the toothed rim 3 from composite molding material consisting of fibrous material and a binder, the fibrous material being employed either in the form of sheets of paper, cloth, or other fabric, coated or impregnated with a binder, or in masses of loose fibers mixed with a binder in solution or in dry, powdered form.

The binder may consist of any suitable adhesive substance, such as shellac, copal, or other varnish gum or gum resin, but it is preferably a synthetic resin, such as the well known condensation products of phenols and formaldehyde.

One suitable material for the toothed rim 3 is a strong and durable composite substance made by superimposing a number of laminations of fibrous sheet material, such as paper or cloth, associated with a phenolic condensation product, or other suitable binder, and united into a hard and compact mass by the application of heat and pressure.

If the binder employed is a phenolic condensation product, the applied heat and pressure will transform the binder into its hard, infusible and substantially insoluble condition.

The above mentioned material may be made according to the method described in the patents to Conrad, Nos. 1,167,742 and 1,167,743, granted January 11, 1916, and toothed rings for utilization in making the gear wheels according to my present invention may be cut in composite plates in the manner described in the Conrad patents.

Another and more economical method of forming the gear rings consists in stamping annular blanks from sheets of paper or cloth impregnated with a binder, such, for example, as a phenolic condensation product, superimposing a sufficient number of the stamped blanks to make up the required thickness of the gear ring and compacting the ring in a heated mold after the manner described and claimed in the application for Letters Patent of Arthur J. Bastian, Serial No. 38,265, filed July 6, 1915, and assigned to the Westinghouse Electric & Manufacturing Company.

Gear rings for utilization according to my invention may also be formed by stamping or cutting segmental blanks from paper or fabric, coated or impregnated with a binder, such segments comprising, for example, one-fourth of a complete circle. The segments are assembled end to end to form a ring, and rings made in this manner are stacked one upon the other, the points at which the segments of each ring touch each other being staggered. When a suitable number of blanks have been stacked, one upon the other, in this manner, the pile is pressed and heated, thereby forming a ring in which the required gear teeth are cut.

The blanks may be simply annular in shape, in which case the teeth are cut from the finished ring by ordinary gear cutting methods, or the blanks may be stamped and molded in the exact form of the finished gear ring, in which case no subsequent machining is necessary.

If desired, the blanks from which the rings are formed may conform roughly to the shape of the gear teeth, the teeth being finished in the same manner as ordinary metal gears are finished after the teeth are roughed out.

In assembling a gear wheel, such as that shown in Figs. 1 and 2, the rim 3, either provided with teeth or not, as desired, may be pressed over the hub 1, which should be of such diameter that it will fit tightly upon the hub portion. This may be done with the rim cold or after it has been heated in any suitable manner, as by immersing it for a few minutes in boiling water.

Preferably, however, the toothed rim 3 is molded directly upon the hub 1 in order that the roughened surface of the hub may be pressed into the rim while the material composing the rim is still plastic. Either of the molding methods mentioned may be employed for this purpose, the roughened support or hub portion being placed in the mold, the molding or the impregnated rings or segments of fabric forming the working body of the gear wheel being placed about the periphery of the support and heat and pressure being finally applied to the assembled materials in order to complete the gear wheel.

Various methods have been employed, heretofore, to insure good binding action between the rim and the hub portion, but I have found that the waved ribs may be more easily provided and insure exceptionally good binding action between the metallic and non-metallic portions of a finished gear wheel. The impregnated material which fits into the waved depressions, when heated and hardened, provides a series of waves corresponding to those of the hub portion which are approximately as strong mechanically as the metal ribs. The particular manner of providing a roughened surface, as above disclosed, insures a stronger resistance mechanically against side thrusts than roughened surfaces employed heretofore.

While I have particularly described my invention in connection with toothed gear wheels, it will be appreciated that it has a wide range of use in the construction of pulleys, wheels, drums, cams, and, in fact, all hubbed elements in which the working body portion may be constructed of fibrous material and a phenolic condensation product, may be made in this manner. Furthermore, other composite materials or composite materials having other binders may be employed. It is to be understood, therefore, that my invention is not limited to the particular structures or materials and that no other limitations are to be imposed except such as are indicated in the claims.

I claim as my invention:—

1. A machine element comprising a hub-portion having a periphery so grooved as to provide waved projection portions and superimposed layers of fibrous material impregnated with a binder molded thereon.

2. A machine element comprising a hub-portion having a periphery so grooved as to provide symmetrically waved projecting portions and superimposed layers of fibrous material impregnated with a binder molded thereon.

3. A machine element comprising a hub-portion having a series of continuous waved ribs formed on its periphery and superimposed layers of fibrous material impregnated with a binder molded thereon.

4. A method of making machine elements that comprises forming a hub portion with a plurality of continuous waved ribs on its periphery, impregnating fibrous material with a binder, disposing layers of the material upon the hub and applying heat and pressure to compact the material and to harden the binder.

5. A machine element comprising a hub-portion having transverse grooves and a series of continuous waved ribs formed on its periphery and superimposed layers of fibrous material impregnated with a binder molded thereon.

In testimony whereof, I have hereunto subscribed my name this 31st day of July, 1919.

PHILIP E. HENNINGER.